No. 816,897. PATENTED APR. 3, 1906.
O. E. BRAY.
DISTRIBUTING NOZZLE FOR PNEUMATIC CONVEYER PIPES.
APPLICATION FILED DEC. 27, 1904.

WITNESSES
INVENTOR
Oscar E. Bray
By Parker & Burlow Attorneys.

UNITED STATES PATENT OFFICE.

OSCAR E. BRAY, OF WARSAW, NEW YORK.

DISTRIBUTING-NOZZLE FOR PNEUMATIC CONVEYER-PIPES.

No. 816,897.          Specification of Letters Patent.          Patented April 3, 1906.

Application filed December 27, 1904. Serial No. 238,310.

*To all whom it may concern:*

Be it known that I, OSCAR E. BRAY, a subject of the King of Great Britain, residing at Warsaw, county of Wyoming, State of New York, have invented a certain new and useful Improvement in Distributing-Nozzles for Pneumatic Conveyer-Pipes; and I declare the following to be a full, clear, and exact description of the invention, such as will enable others skilled in the art to which it pertains to make and use the same, reference being had to the accompanying drawings, which form a part of this specification.

This invention relates to distributing-nozzles for pneumatic conveyer-pipes.

It has for its object an improved distributing attachment to be applied to the nozzle end of the pipes through which material is lifted and carried to a place of storage. Such pneumatic conveyer-pipes are in common use for lifting and distributing ensilage and similar material.

Figure 1:
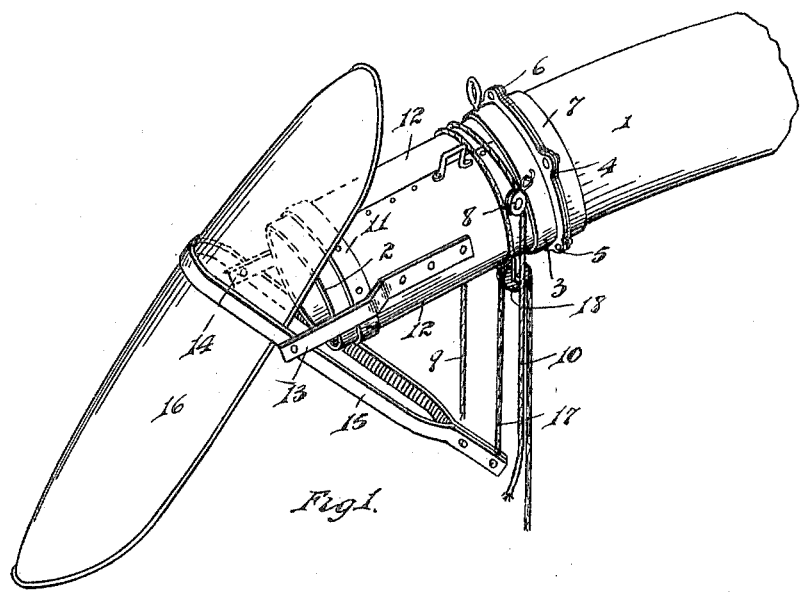
Figure 2:
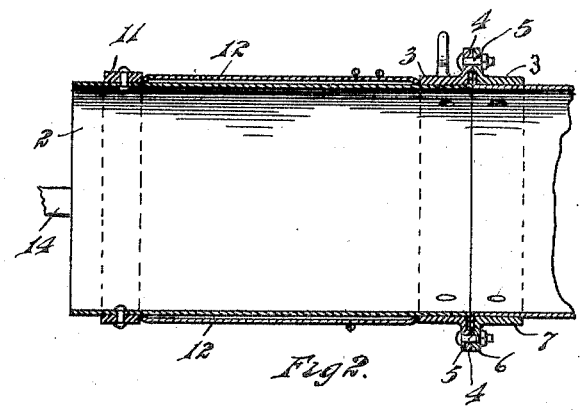

In the drawings, Figure 1 is a perspective of the pipe end. Fig. 2 is a section.

1 indicates the end of the carrying-pipe, and 2 indicates a nozzle which sustains the distributer and which is secured to the pipe 1 by a collar 3, secured to that end of the nozzle-piece 2 which lies adjacent to the pipe 1 and provided with lugs 4, through which bolts 5 engage. The bolts 5 engage through lugs 6 on a similar collar 7, that is secured to the end of the pipe 1. The collar 3 furnishes a stable foundation to support eyes or lugs 8, that hold the ends 9 and 10 of the actuating-cord. Near the open end of the pipe 2 is a collar 11, and between the collar 11 and the collar 3 is a sleeve or jacket-ring 12, that is capable of rotation on the pipe 2, but is prevented from longitudinal movement thereon by the collars 11 and 3. To this rotative jacket 12 are secured two struts 13 and 14, that project beyond the end of the pipe 2 and have pivotally connected to them a yoke 15, which carries a directing-shield 16. The shield 16 is a curved plate of metal employed to guide and direct the material emerging from the conveyer-pipe. The ends of the yoke 15 are brought together and have secured to them an adjusting-cable 17, which passes over a sheave 18, that hangs from the collar 3, by means of which the yoke 15 may be employed as a lever to swing the guide 16 and change its relation to the longitudinal axis of the pipe 1. Draft-cord ends 9 and 10 are each made fast to the sleeve 12 with a rolling hitch and are arranged to turn the sleeve 12 in either direction, and the sleeve 12 carries the hood 16, which is pivotally connected to the struts 13 and 14, thus giving to the hood a universal movement within the control of the attendant manipulating the cords 9, 10, and 17.

What I claim is—

1. A distributing attachment for pneumatic conveyer-pipes, having in combination a sleeve rotatably engaging over the end of said pipe, a plurality of collars rigidly fixed to said pipe, one at each end of said sleeve, strut members projecting from said sleeve past the outer end of said pipe, a directing-shield, a holder carrying the same, pivotally mounted between said strut members, and a plurality of cord systems, one whereby the sleeve may be rotated in either direction with respect to the pipe, and the other whereby the position of said deflecting-shield and holder with respect to the sleeve and the pipe-terminal may be regulated, substantially as described.

2. A distributing attachment for pneumatic conveyer-pipes having in combination a sleeve rotatively mounted on the free end of the pipe, struts carried thereby and projecting beyond the end of the pipe, a holding-yoke pivotally carried by said struts across the end of the pipe, a directing-shield carried by said yoke, an adjusting-cable whereby the position of said yoke and distributing-guide with respect to said sleeve may be regulated, and adjusting-cables secured to said sleeve and independent of said first-mentioned cable whereby the sleeve may be rotated with respect to the pipe, substantially as described 3. A distributing attachment for pneumatic conveyer-pipes, having in combination a deflector member, a yoke carrying the same, a sleeve rotatably carried on the end of the conveyer-pipe, struts projecting therefrom beyond the end of the pipe, whereon said yoke is pivotally mounted, means fixed to the pipe whereby longitudinal movement of the sleeve thereupon is prevented, and a plurality of adjusting-cables, one whereby the position of the deflector and yoke across the end of the pipe may be regulated, and the other whereby the sleeve may be rotated with respect to the pipe, substantially as described.

4. A distributing attachment for pneumatic conveyer-pipes, having in combination a sleeve rotatably mounted near the free end of the pipe, a plurality of collar members one at each end of said sleeve, said members being fixed to the pipe and being adapted to prevent longitudinal movement of said sleeve, a cable system whereby said sleeve may be rotated in either direction, struts projecting from said sleeve past the end of the pipe, a yoke pivotally mounted therebetween, a distributing-shield carried by said yoke, and a cable connecting said yoke and said sleeve whereby their relative position may be changed.

In testimony whereof I sign this specification in the presence of two witnesses.

OSCAR E. BRAY.

Witnesses:
   MAY E. KOTT,
   CHARLES F. BURTON